(No Model.) 2 Sheets—Sheet 1.
W. F. BRAUN.
INDICATOR WITH AUTOMATIC STOPPING MECHANISM.
No. 590,512. Patented Sept. 21, 1897.
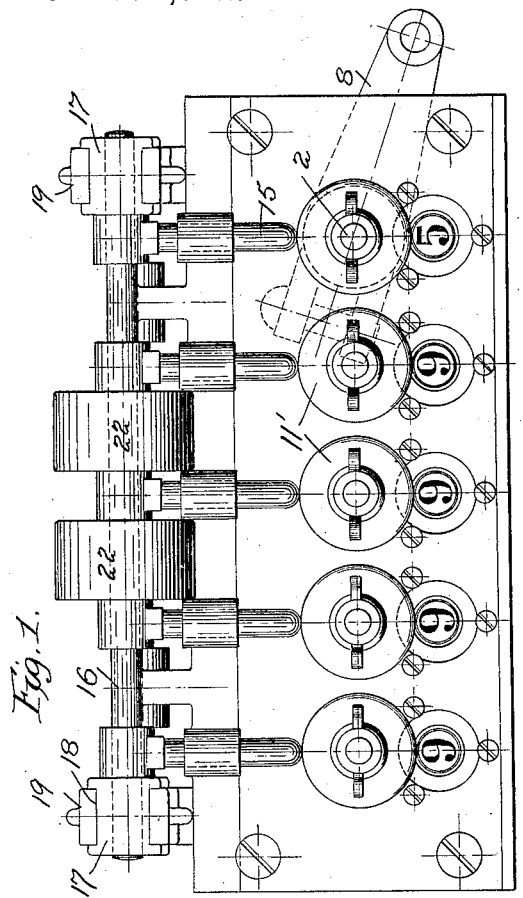
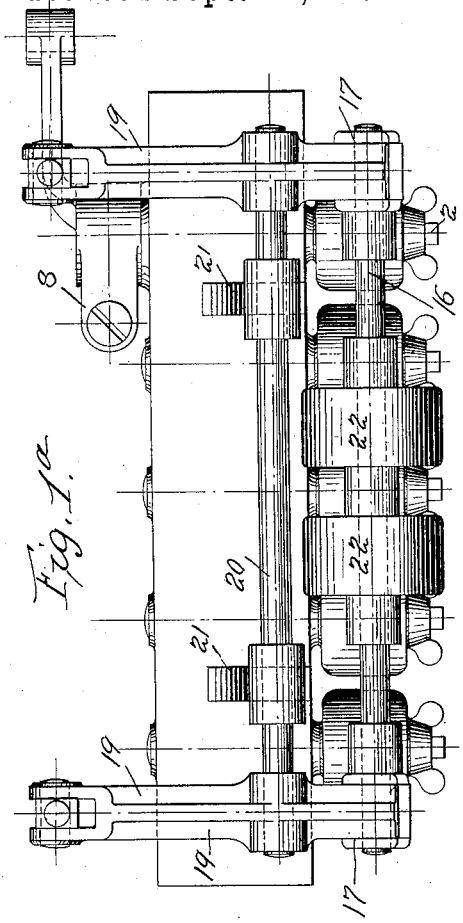
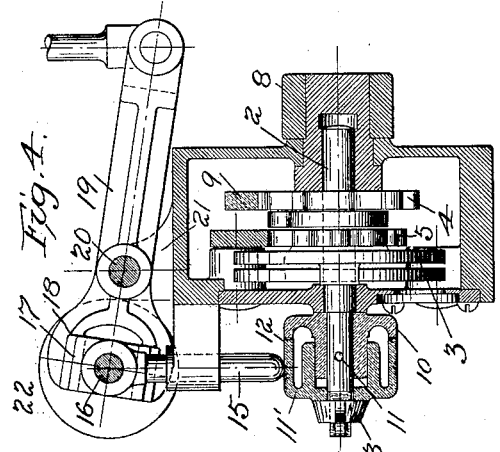
Witnesses
C. S. Middleton
Wm. F. Hall
Inventor
William F. Braun
By his Attorneys
Walter Donaldson & Co.
THE NORRIS PETERS CO., PHOTO-LITHO., WASHINGTON, D. C.

(No Model.) 2 Sheets—Sheet 2.
W. F. BRAUN.
INDICATOR WITH AUTOMATIC STOPPING MECHANISM.
No. 590,512. Patented Sept. 21, 1897.
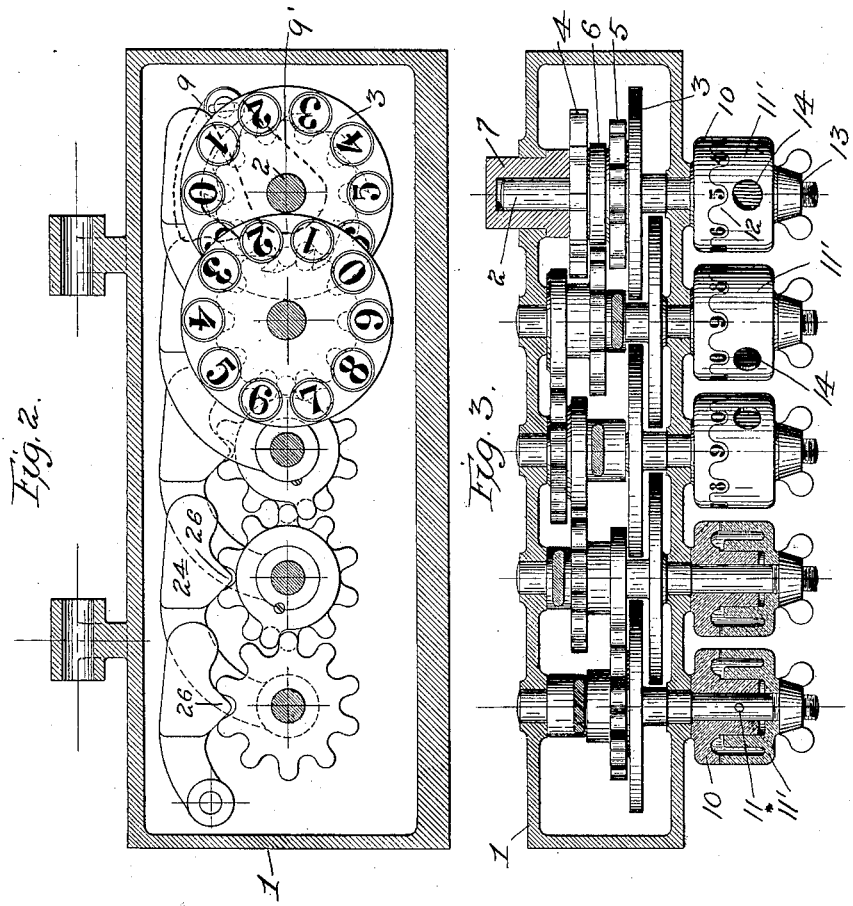

UNITED STATES PATENT OFFICE.

WILLIAM F. BRAUN, OF CHICAGO, ILLINOIS.

INDICATOR WITH AUTOMATIC STOPPING MECHANISM.

SPECIFICATION forming part of Letters Patent No. 590,512, dated September 21, 1897.

Application filed December 2, 1896. Serial No. 614,185. (No model.)

*To all whom it may concern:*

Be it known that I, WILLIAM F. BRAUN, a citizen of the United States, and a resident of Chicago, county of Cook, and State of Illinois, have invented certain new and useful Improvements in Indicators with Automatic Stopping Mechanism, of which the following is a full, clear, and exact description.

It is the object of my invention to provide an indicating mechanism combined with means for stopping and locking the same when the device has been moved sufficiently to indicate the amount or number for which the machine is set, said mechanism including means by which the indicator may be quickly and accurately set to be stopped and locked at any desired number.

I aim especially to provide an indicator for use on automatic weighing-machines, such as is disclosed in my application for United States Letters Patent, Serial No. 613,294, filed November 24, 1896; but it will be readily understood that my present invention is not limited in its application to such machines, but may be applied wherever it is desired to employ a self-locking indicator which may be set at will to be locked when the desired number is displayed.

My invention includes an indicator-disk adapted to be connected with the machine to be moved thereby step by step, an adjustable stop or locking sleeve connected to the indicator-disk to be moved thereby, said sleeve being adjustable in relation to the indicator-disk and carrying a stop or locking device, preferably an opening or depression, which by the said adjustment of the sleeve may be set to correspond with any desired number on the disk; and in connection with this my invention includes a stop or locking pin arranged above the locking-sleeve, so that as the opening is brought around by the movement of the sleeve beneath the pin this will drop and not only lock the sleeve and the indicator by falling into the opening in the sleeve, but its movement may be used to free connections leading to a valve, belt-shifter, or other device which will stop the operation of the machine, said pin when used in my automatic weighing-machine controlling the closing of the feeding devices to stop the flow of material and thus stop the machine.

I have shown my indicating mechanism as made up of a series of indicating-disks with their locking-sleeves and locking-pins, and it will be understood that any desired number of disks, one or more, may be employed.

In the accompanying drawings, Figure 1 is a face view of the entire mechanism. Fig. 1ª is a plan view of the same. Fig. 2 is a longitudinal sectional view through the casing, showing the toothed carrying-wheels and the ratchet. Fig. 3 is a horizontal sectional view through the casing, with parts in section and parts in plan; and Fig. 4 is a transverse section through the casing, with parts in section and parts in elevation.

In the drawings, 1 is the casing, supporting at one end a transverse shaft 2, carrying fixed thereto an indicating-disk 3, a ten-toothed ratchet-wheel 4, and a ten-toothed wheel 5, and a one-toothed wheel 6. The rear end of this shaft has a loose sleeve 7 about it which extends outside the rear of the casing, where it has upon it an arm or lever 8, adapted to be connected to any moving part of the machine to be oscillated thereby, whereas from the inner end of the sleeve a pawl-arm 9' (dotted lines, Fig. 2) extends to one side of the same, to which is pivoted a pawl 9, engaging with the ratchet 4 to give a step-by-step movement thereto. The front end of the shaft extends through the front of the casing and projects far enough to receive a clutch-sleeve 10, fixed thereto by a pin 11 and a sleeve 11', the hub of which is adapted to turn freely about the hub of the fixed clutch part. This sleeve has a toothed edge 12 to engage the tooth edge of the clutch, and by loosening a nut 13 on the threaded end of the shaft the sleeve may be drawn forward slightly, so as to disengage the teeth, and then the sleeve may be turned to bring an opening 14 therein to any desired position opposite any desired tooth on the clutch part, which teeth are of the same number and are marked to correspond with the numbers on the indicator-disk, when by tightening up the nut the locking-sleeve may be fixed rigidly to the clutch part and thus connected rigidly with the indicator-disk.

A vertically-movable pin 15 is guided loosely in a lug projecting from the front face of the casing, said pin being carried by a rod 16, which in turn is carried in sliding boxes 17, adapted to move out and in slightly on ways 18 in the forked ends of levers 19, journaled on a rod 20, held by the brackets 21, projecting up from the casing. Weights 22 are carried by the cross-rod, so that the pin has a constant tendency to fall. The rear ends of the levers 19 are connected in any suitable manner with any device adapted to stop the machine—such as a valve, switch, or belt-shifter—and it will be seen that when the pin falls, due to the opening in the locking or stopping disk coming beneath it, this action will be communicated to the belt-shifter or other device and the machine will be stopped.

It will be understood that any number of disks, with their locking-sleeves and stop-pins, may be provided, and the movement is carried from one disk to the next by the series of one-tooth and ten-tooth wheels in the well-known way, and when a series are used, such as shown, the locking-disks may be set for any desired number and the device will continue to indicate until all of the openings are brought beneath the stop-pins, when the locking action will take place.

In order to prevent the indicating-disk from being displaced, due to any cause, such as jarring of the machine, I employ detents 24, consisting of weighted arms pivoted loosely on the dial-shafts and having weighted ends with teeth 26, adapted to engage the teeth of the ten-tooth wheels and hold them in position.

I claim as my invention—

1. In combination with an indicating-disk, a locking-sleeve adjustable in relation to the disk and arranged to be rigidly connected thereto, said sleeve carrying a stop device and a locking device arranged to act in connection therewith, substantially as described.

2. In combination, the indicating-disk, with means for operating the same, the clutch-jaw connected rigidly thereto and having teeth and with numbers to correspond with those of the disk, a locking-sleeve having teeth to engage the teeth of the clutch-jaw, said sleeve having an opening, means to permit the sleeve to be adjusted and to hold the same when adjusted, a locking-pin adapted to fall into the opening in the sleeve when it registers therewith and means for guiding the locking-pin.

3. In combination with the indicating-disk, with its adjustable perforated sleeve, the locking-pin adapted to fall into the opening, the lever, the sliding connection between the lever and the pin and connections leading from the lever, substantially as described.

4. In combination with the series of indicating-disks, with their adjustable locking-sleeves, the series of pins, the cross-rod on which the series of pins are held, the weights, the levers, the sliding connections between the levers and the cross-rod and carrying mechanism between the disks, substantially as described.

5. In combination the series of indicating-disks, the series of adjustable sleeves having openings or stops, the cross-rod having a series of pins to engage the stops, said rod with the pins being movable vertically toward the sleeves and means for movably supporting the cross-rod, substantially as described.

6. In combination the series of indicating-disks, the adjustable sleeves connected therewith having stops, the series of stop-pins, the cross-rod carrying the same, and the pivoted levers carrying the cross-rod, substantially as described.

7. In combination, the series of indicating-disks, the casing inclosing the same, the shafts for the disks projecting outside of and to the front of the casing, the series of adjustable stop-sleeves on the front ends of the shafts, means for connecting the sleeves rigidly with the disks, a vertically-movable cross-rod, the supporting means therefor at the top of the casing and the series of pendent pins extending down in front of the casing to engage the stop-sleeves, substantially as described.

8. In combination, the indicating-disks, the shaft, the clutch-jaw fixed thereon, the top sleeve engaging the clutch and adjustable about the shaft, said sleeve having a stop, and means acting in conjunction therewith, substantially as described.

9. In combination, the series of indicating-disks, with their shafts, the series of clutches having teeth which are numbered, said clutches being on the shafts, and a series of sleeves loose on the shafts and adapted to be set in connection with the clutch-jaws and a series of stops, substantially as described.

In testimony whereof I have hereunto set my hand in presence of two witnesses.

WILLIAM F. BRAUN.

Witnesses:
HENRY FORNOFF,
WALTER DONALDSON.